United States Patent
Mese et al.

(10) Patent No.: US 9,311,292 B2
(45) Date of Patent: Apr. 12, 2016

(54) AUTOMATIC MESSAGE PRESENTATION BASED ON PAST MESSAGES

(71) Applicant: Lenovo (Singapore) Pte. Ltd., New Tech Park (SG)

(72) Inventors: John Carl Mese, Cary, NC (US); Russell Speight VanBlon, Raleigh, NC (US); Arnold S. Weksler, Raleigh, NC (US); Rod David Waltermann, Rougemont, NC (US); Nathan J. Peterson, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 144 days.

(21) Appl. No.: 14/159,042

(22) Filed: Jan. 20, 2014

(65) Prior Publication Data
US 2015/0205784 A1    Jul. 23, 2015

(51) Int. Cl.
  *G06F 17/27* (2006.01)
  *G06F 17/30* (2006.01)
  *H04W 4/12* (2009.01)
(52) U.S. Cl.
  CPC .............. *G06F 17/276* (2013.01); *H04W 4/12* (2013.01)

(58) Field of Classification Search
None
See application file for complete search history.

(56) References Cited

U.S. PATENT DOCUMENTS

| | | | | |
|---|---|---|---|---|
| 8,938,688 B2* | 1/2015 | Bradford | ............... | G06F 3/0481 706/11 |
| 2006/0247915 A1* | 11/2006 | Bradford | ............... | G06F 3/0481 704/1 |
| 2013/0212190 A1* | 8/2013 | Patil | ....................... | G06F 17/276 709/206 |

* cited by examiner

*Primary Examiner* — Marcus T Riley
(74) *Attorney, Agent, or Firm* — John L. Rogitz; John M. Rogitz

(57) ABSTRACT

In one aspect, a device includes a processor and a memory accessible to the processor. The memory bears instructions executable by the processor to access past messages associated with the device, and determine that at least a first multi-term phrase appears in plural messages among the past messages. The instructions are also executable by the processor to, responsive to input invoking message composition and based at least in part on a determination that the multi-term phrase appears in plural messages among the past messages, present on the device at least plural terms from the multi-term phrase in an order in which the at least plural terms appear in the multi-term phrase as a candidate message.

22 Claims, 5 Drawing Sheets

AUTOMATIC MESSAGE PRESENTATION BASED ON PAST MESSAGES

I. FIELD

The present application relates generally to automatically presenting messages based on past messages.

II. BACKGROUND

When composing a message on a device, it is sometimes the case that the message being composed is similar in at least some respects to previous messages that have been composed. This makes composing a new message from scratch that is to share similarities with past messages annoying, unnecessary, and laborious.

SUMMARY

Accordingly, in a first aspect a device includes a processor and a memory accessible to the processor. The memory bears instructions executable by the processor to access past messages associated with the device, and determine that at least a first multi-term phrase appears in plural messages among the past messages. The instructions are also executable by the processor to, responsive to input invoking message composition and based at least in part on a determination that the multi-term phrase appears in plural messages among the past messages, present on the device at least plural terms from the multi-term phrase in an order in which the at least plural terms appear in the multi-term phrase as a candidate message.

In another aspect, a method includes identifying stored messages with respective multi-term phrases as being candidate messages based on each of the multi-term phrases appearing plural times in a data structure, associating at least some of the candidate messages with respective candidate recipients, and responsive to input indicating at least in part a candidate recipient, presenting at least one candidate message associated with the candidate recipient.

In still another aspect, an apparatus includes a first processor, a first network adapter, and storage. The storage bears instructions for execution by a second processor for sending messages, storing at least some of the messages in a data structure, and automatically presenting on the apparatus a message from the data structure responsive to input to send a message and based at least in part on an identification of a recipient in the data structure. The first processor transfers the instructions over the network via the first network adapter.

The details of present principles, both as to their structure and operation, can best be understood in reference to the accompanying drawings, in which like reference numerals refer to like parts, and in which:

DETAILED DESCRIPTION

Figure 1:
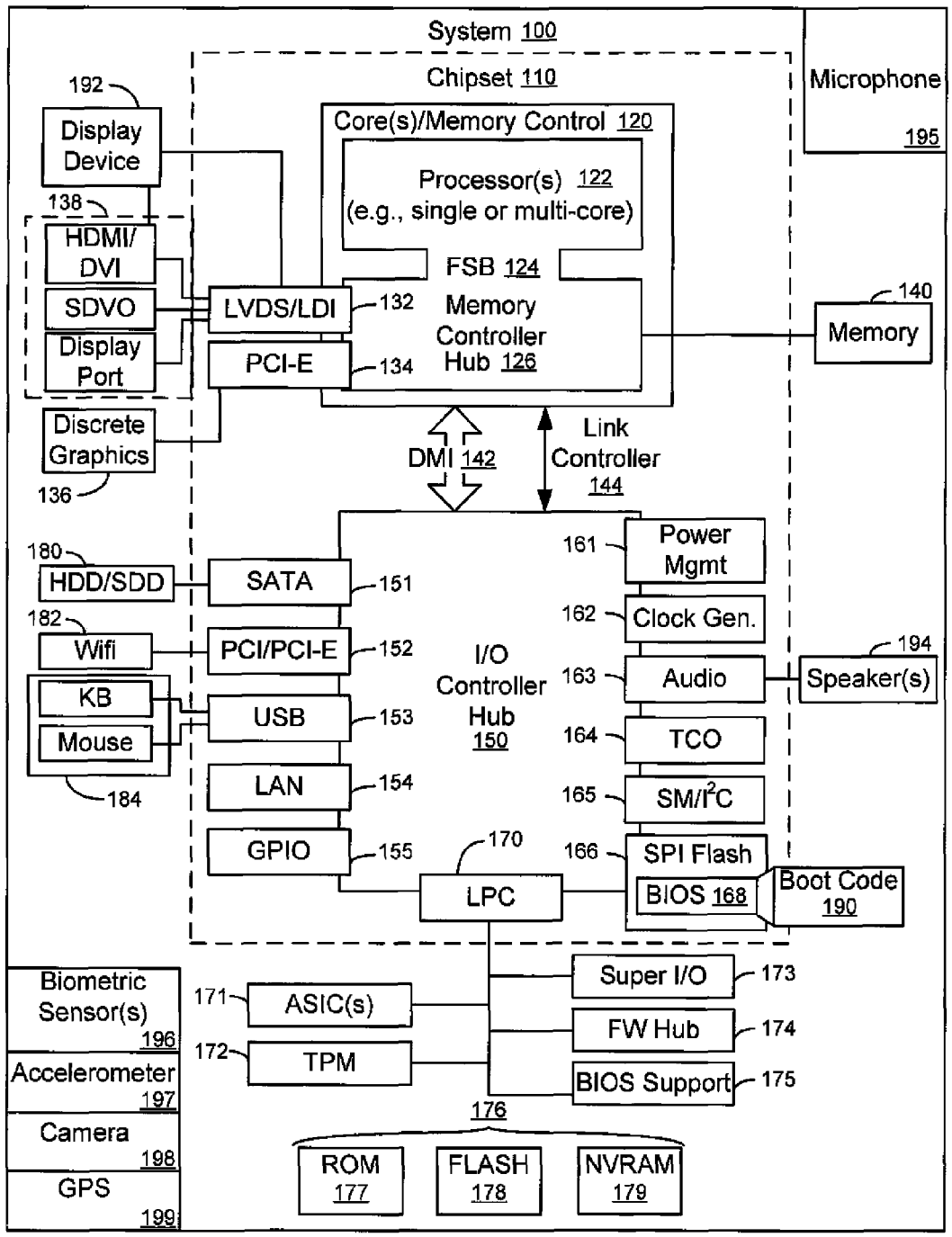
FIG. 1 is a block diagram of an exemplary system in accordance with present principles.

This disclosure relates generally to device based user information. With respect to any computer systems discussed herein, a system may include server and client components, connected over a network such that data may be exchanged between the client and server components. The client components may include one or more computing devices including televisions (e.g. smart TVs, Internet-enabled TVs), computers such as desktops, laptops and tablet computers, and other mobile devices including smart phones. These client devices may employ, as non-limiting examples, operating systems from Apple, Google, or Microsoft. A Unix operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various subroutines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g. that may not be a carrier wave) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, it shows an exemplary block diagram of an information handling system and/or computer system 100 such as e.g. an Internet enabled, computerized telephone (e.g. a smart phone), a tablet computer, a notebook or desktop computer, an Internet enabled computerized wearable device such as a smart watch, a computerized television (TV) such as a smart TV, etc. Thus, in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including e.g. one of more GPUs). An exemplary system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be carrier waves. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

In addition to the foregoing, the system 100 is understood to include an audio receiver/microphone 195 in communication with the processor 122 and providing input thereto based on e.g. a user providing audible input to the microphone 195 in accordance with present principles (e.g. to provide audible input to create a message). One or more biometric sensors 196 are also shown that are in communication with the processor 122 and provide input thereto, such as e.g. heart rate sensors and/or heart monitors, blood pressure sensors, iris and/or retina detectors, oxygen sensors (e.g. blood oxygen sensors), glucose and/or blood sugar sensors, pedometers and/or speed sensors, body temperature sensors, etc. Furthermore, the system 100 may include one or more accelerometers 197 or other motion sensors such as e.g. gesture sensors that are in communication with the processor 122 and provide input thereto.

A camera 198 is also shown, which is in communication with and provides input to the processor 122. The camera 198 may be, e.g., a thermal imaging camera, a digital camera such as a webcam, and/or a camera integrated into the system 100 and controllable by the processor 122 to gather pictures/images and/or video. In addition, a GPS transceiver 199 is shown that is configured to e.g. receive geographic position information from at least one satellite and provide the information to the processor 122. However, it is to be understood that another suitable position receiver other than a GPS receiver may be used in accordance with present principles to e.g. determine the location of the system 100.

Figure 2:
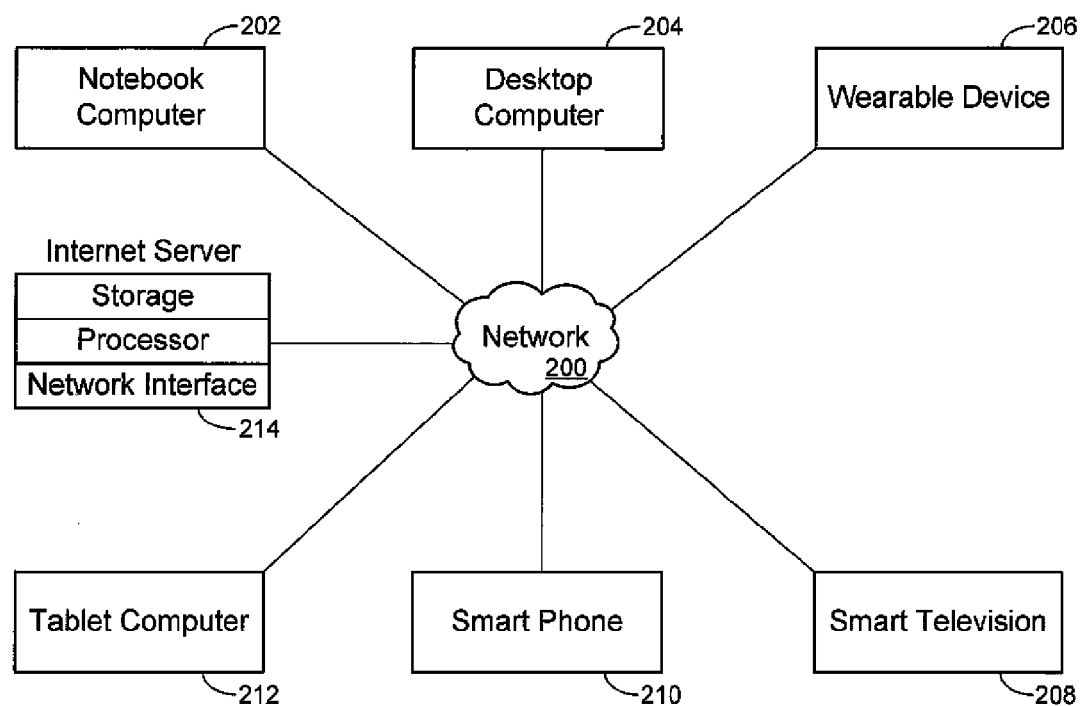
FIG. 2 is a block diagram of a network of devices in accordance with present principles.

Before moving on to FIG. 2, it is to be understood that an exemplary client device or other machine/computer may include fewer or more features than shown on the system 100 of FIG. 1. In any case, it is to be understood at least based on the foregoing that the system 100 is configured to undertake present principles.

Turning now to FIG. 2, it shows exemplary devices communicating over a network 200 such as e.g. the Internet in accordance with present principles is shown. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g. a smart watch, a smart television (TV) 208, a smart phone 2120, a tablet computer 212, and a server 214 in accordance with present principles such as e.g. an Internet server that may e.g. provide cloud storage accessible to the devices 202-212. It is to be understood that the devices 202-214 are configured to communicate with each other over the network 200 to undertake present principles.

Figure 3:
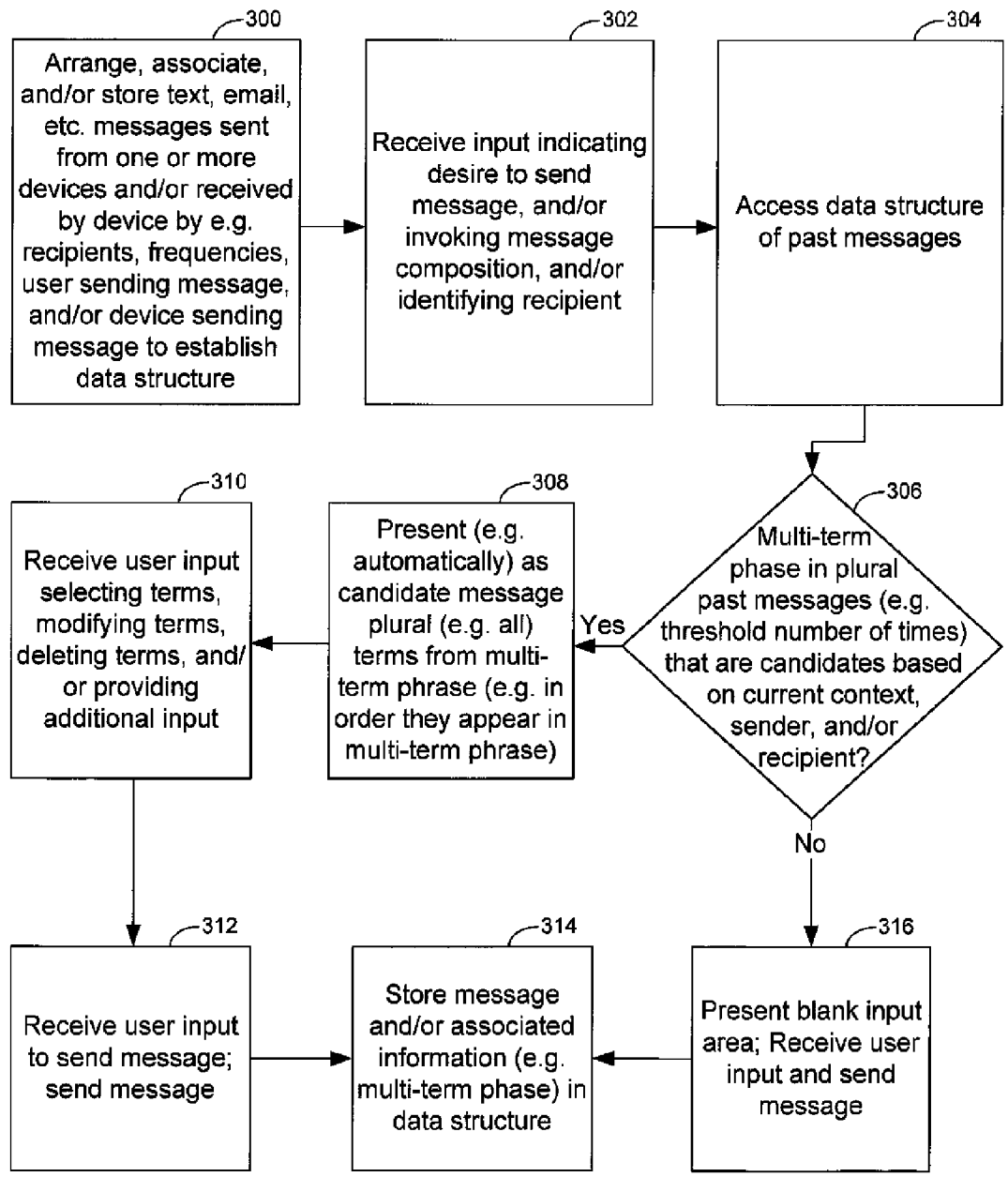
FIG. 3 is an exemplary flowchart of logic to be executed by a system in accordance with present principles.

FIG. 3 illustrates logic that may be executed by any of the foregoing devices. Beginning at block 300, the logic stores, organizes, arranges, and/or associates (e.g. in ways to be described shortly and in e.g. a data structure stored locally on the device undertaking the logic of FIG. 3, a cloud storage area accessible to the device, another device accessible to the device undertaking the logic of FIG. 3, etc.) at least one message previously sent by the device of FIG. 3 or another device for which the device of FIG. 3 has access to its previously sent message(s) therefrom. The messages, or at least portions thereof such as e.g. multi-term phrases contained therein, may be stored, organized, arranged, and/or associated (hereafter referred to simply as "stored, etc." for convenience) by and/or based on frequency of use generally (e.g. irrespective of e.g. sender, recipient, and/or device), frequency of use of transmission to particular recipients, frequency of input to the device of FIG. 3 (and/or frequency of origination from the device of FIG. 3), frequency of input by a user of the device of FIG. 3, and/or frequency of receipt by the device of FIG. 3 or another device, etc. For clarity, hereafter "the device" refers to the device undertaking the logic of FIG. 3, and "another device" refers to at least one other device for which the device of FIG. 3 has access to messages associated therewith, sent therefrom, received thereat, etc.

Note that in addition to or in lieu of the foregoing, the messages, or at least portions thereof such as e.g. multi-term phrases contained therein, may be stored in some embodiments, etc. in the data structure without respect to frequency and/or based simply on recipient person of the message, sending person of the message, recipient device of the message, and/or sending device of the message. Note further that in addition to or in lieu of the foregoing, the messages, or at least portions thereof such as e.g. multi-term phrases contained therein, may be stored, etc. in the data structure based on any combination and/or sub-combination of one or more of the foregoing parameters, types, and/or classifications. What's more, it is to be understood that messages that may be stored, arranged, and/or associated include but are not limited to text messages, email messages, social networking messages, so-called "instant messages," etc.

Accordingly, it is to be understood that in at least some embodiments, the messages may be stored, etc. in the data structure e.g. by both respective recipient and respective frequency with which the respective messages appears in the data structure. E.g., all messages to a particular recipient may be organized into sub-groups for the recipient such that e.g. messages to the recipient containing one or more common multi-term phrases may be grouped together in one group (e.g. and/or separate from a group of messages to the same recipient containing different multi-term phrases and/or not including the same multi-term phrases as other groups for the recipient).

Still in reference to FIG. 3, after block 300 the logic proceeds to block 302, at which the logic receives input indicating a desire to send one or more messages, and/or receives input invoking message composition, and/or identifying a (e.g. desired) recipient of a message. The logic then moves to block 304 where the logic accesses the data structure described herein, and thereafter proceeds to decision diamond 306.

At diamond 306, the logic determines based at least in part on data in the data structure whether at least one multi-term phrase has appeared in at least one and e.g. plural messages among the past messages that may be candidate messages for the message to be composed based on the input received at block 302. Note further that in some embodiments, the determination made at diamond 306 of a candidate message may be determined as such e.g. if the multi-term phrase has been used a threshold number of times in messages e.g. as input to the device (e.g. and/or originated from the device), as received by the device, as input by a particular person, and/or as received by a particular person, etc.

Note even further that the determination made at diamond 306 may be based on input received at block 302 such as e.g. the desired recipient, the sending person of the message, the sending device of the message, and/or the recipient device of the message. What's more, the determination at diamond 306 may be based on a current context as well, such as e.g. the time of year being around the holidays (e.g. in such an instance "Merry Christmas" may be determined to be a candidate message but only in the month of December when it is frequently used, but not e.g. January through November). Current context may also include e.g. relevant birthdays, anniversaries, etc. that may be determined based on e.g. calendar information for at least one electronic calendar accessible to the device. Thus, it is to be understood that in some embodiments context may include frequency of use of the message and/or the multi-term phrase at and/or during particular time of day, week, month, and/or year. It is to be further understood that context(s) may be associated with multi-term phrases as stored, etc. in the data structure at block 300, as well in combination with the other bases described above.

In any case, note that a negative determination at diamond 306 cause the logic to proceed to block 316, at which the logic e.g. presents a blank input area for message composition or at least presents an input area not necessarily including a multi-term phrase previously used in one or more past messages even if e.g. presenting generic candidate messages. Also at block 316, the logic may receive user input for message composition and to send the message, and then actually send the message to the recipient. The logic then proceeds from block 316 to block 314, to be described shortly.

However, referring back to diamond 306 again, an affirmative determination made thereat causes the logic to instead proceed to block 308, at which the logic presents (e.g. automatically without user input subsequent to e.g. the input received at block 302) as a candidate message plural (e.g. and/or all) terms from the multi-term phrase(s) e.g. in an order in which the at least plural terms appear in the multi-term phrase. The logic then proceeds to block 310 where the logic receives user input selecting at least one term from the multi-term phrase (and/or selecting the multi-term phrase itself) and/or confirming it is to be used for the message being composed. Also at block 310, the logic may receive user input modifying at least a portion of at least one term from the multi-term phrase (and/or modifying the multi-term phrase itself), and/or deleting at least a portion of at least one term from the multi-term phrase (and/or deleting the multi-term phrase itself). Still further, at block 310 the logic may receive additional user input to compose the message (e.g. adding additional text beyond the multi-term phrase to thus e.g. customize or render further unique the message).

Still in reference to FIG. 3, after block 310 the logic proceeds to block 312 where the logic receives user input to send the message, and then transmits the message to the recipient (s) (e.g. at least in part using a network adapter of the device). The logic may then proceed to block 314, it being reiterated that block 314 may also be arrived at from block 316 if a negative determination was made at diamond 306. In any case, at block 314 the logic may store, etc. the message and/or associated information (e.g. at least one multi-term phrase therefrom) in the data structure as set forth above in reference to block 300, and/or in a manner as described above in reference to block 300, thus e.g. adding the most-recently composed and sent message to the data structure for future use in accordance with present principles.

Figure 4:
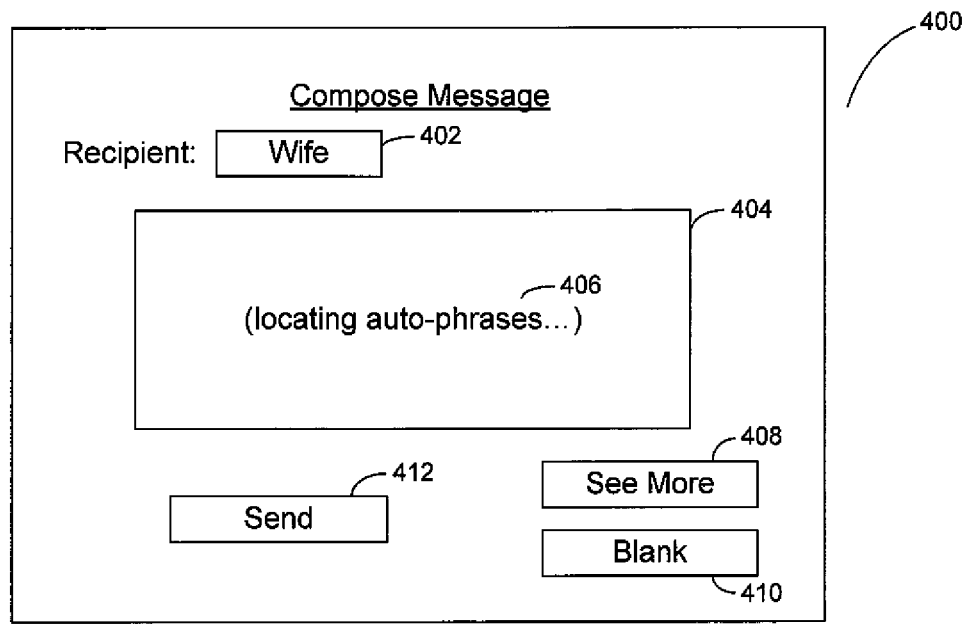
FIGS. 4-6 are exemplary user interfaces (UI) presentable on a system in accordance with present principles.

Continuing the detailed description now in reference to FIG. 4, an exemplary user interface (UI) 400 presentable on a device such as the system 100 in accordance with present principles is shown. The UI 400 includes a recipient field 402 for user input to specify at least one recipient of a message to be composed, along with a with a text input field 404 for entry of a message. Note further that an indication 406 is shown in the field 404 that indicates that the device presenting the UI 400 is locating and/or determining e.g. multi-term phrases that may be candidates for the message being composed, it being thus understood that e.g. the indication 406 may be presented while the device makes the determination(s) discussed above in reference to diamond 306, and furthermore that such a determination in the present instance may be based at least on e.g. the user input specifying the at least one recipient. Accordingly, in the present instance as shown, the user has input the user's wife as the recipient, and hence the device presenting the UI 400 may determine multi-term phrases as candidates based on those phrases being previously transmitted to the user's wife and/or the user's wife's device.

Still in reference to FIG. 4, also included is a see more selector element 408 that is selectable to automatically without further user input present one or more candidate multi-term phrases that are determined in accordance with present principles for selection by the user to, responsive to their selection, automatically without further user input be input by the device into the field 404. The immediately foregoing will be described further in reference to FIG. 5. But still in reference to FIG. 4, note that a blank selector element 410 is also shown that is selectable to automatically without further user input responsive thereto e.g. cause the device to stop locating candidate multi-term phrases and/or not input any previously used multi-term phrase into the field 404 but instead leave the field 404 blank or as it has been (e.g. already) modified by a user (e.g. if the user has already input at least some text that may or may not contain a previously used multi-term phrase). Last, note that a send selector element 412 is shown that is selectable to automatically without further user input responsive thereto transmit at least the text in the field 404 as a message to the recipient indicated in the field 402.

Figure 5:
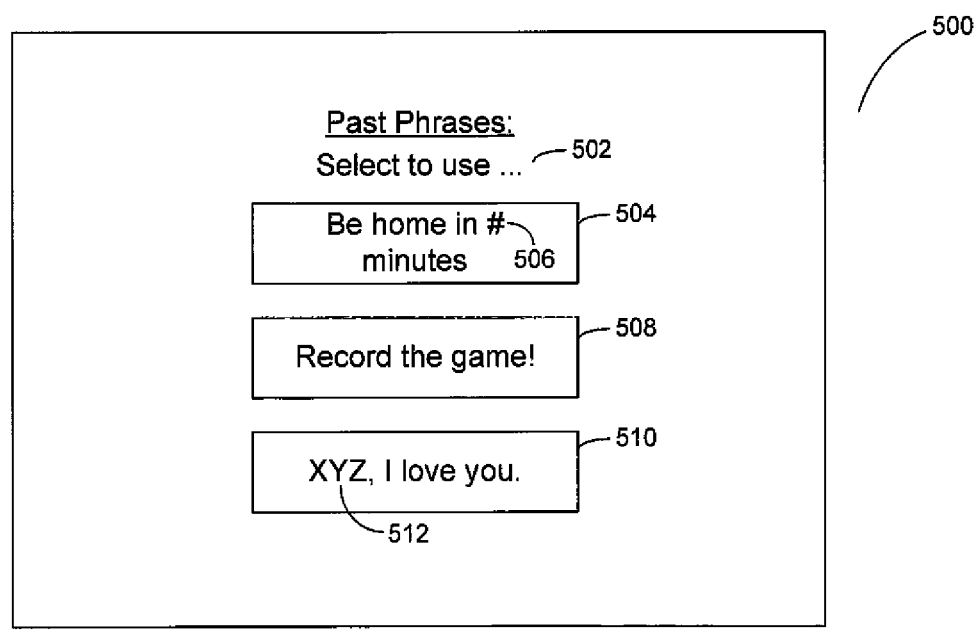

Now in reference to FIG. 5, it shows a UI 500 presenting one or more candidate multi-term phrases previously used in at least one message in accordance with present principles for selection by a user to e.g., responsive to their selection, automatically without further user input be input by the device into a text entry field such as the field 404 described above. Thus, the UI 500 includes an indication 502 that a user is to select one or more of the messages shown on the UI 500. A first selector element 504 is shown that indicates a multi-term phrase and/or message thereon that may be used. Note that the character for the number sign (e.g. "#") is a character that may e.g. dynamically change without user input based on context (e.g. such as in the present instance the device estimating a time until arrival at "home" from a current location based on e.g. GPS coordinates and map information, etc.), and/or is a character that may be presented as such in a text entry field for deletion by a user and replacement with input by a user of an actual number (e.g. five), thus modifying the multi-term phrase shown on the selector element 504 that is to be input to the text entry field (e.g. such as the field 404).

In addition to the foregoing, the UI 500 also includes a second selector element 508 that indicates a multi-term phrase and/or message to "record the game," which based on its selection may be automatically input by the device into a text entry field of a message composition screen in accordance with present principles. Yet a third selector element 510 is shown containing the multi-term phrase "love you," along with the variable XYZ that may e.g. dynamically change without user input based on context (e.g. such as in the present instance the device changing "XYZ" to indicate a particular recipient based on e.g. the recipient being indicated by a user in a recipient field such as the field 402 described above, e.g. and/or based on the device determining that the device and/or user associated therewith typically (e.g. more than once in the past such as a threshold number of times) has sent a message to a particular recipient at the particular current time of day), and/or is a variable that may be presented as such in a text entry field for deletion by a user and replacement with input by a user of a particular recipient, thus modifying the multi-term phrase shown on the selector element 510 that is to be input to the text entry field (e.g. such as the field 404).

Figure 6:
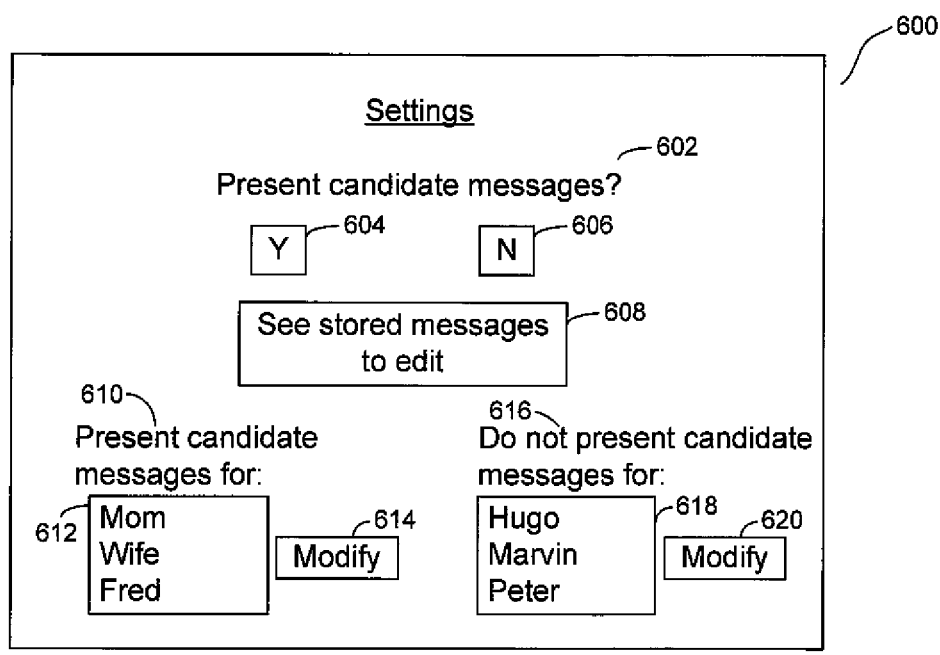

Continuing the detailed description with reference to FIG. 6, it shows a UI 600 for configuring one or more settings of e.g. a software application with code for and/or configured for undertaking present principles. A first setting 602 is shown on the UI 600 that pertains to whether or not to present any candidate messages to a user and/or on a device (e.g. in a text entry field) in accordance with present principles, and accordingly a yes selector element 604 is shown for automatically without further user input configuring the device and/or application to present candidate messages, and also a no selector element 606 is shown for automatically without further user input configuring the device and/or application to not present candidate messages (e.g. instead simply presenting a blank text entry field upon invocation by a user of message composition).

The UI 600 also includes a selector element 608 selectable to automatically without further user input cause e.g. a listing, and/or UI, and/or stored messages, and/or multi-term phrases to be presented (e.g. as derived from the data structure(s) described herein) for editing by a user. Thus, it is to be understood that once edited, such a multi-term phrase as automatically determined to be a candidate message and/or as automatically input to a text entry field will be and/or appear as edited by the user.

In addition to the foregoing, the UI 600 of FIG. 6 may also include a setting 610 for customizing particular recipients, recipient groups, and/or recipient devices for which candidate messages may be presented in accordance with present principles when e.g. composing a message to that particular recipient. Thus, a field 612 is shown and may include one or more recipients for which the user has configured the device to present candidate messages when composing messages thereto, along with a modify selector element 614 selectable to initiate a modify function to change, add, and/or delete recipients from the field 612 (e.g. to add to the field 612, the device may present a listing of contacts for selection based on information from a contact list accessible to the device).

A setting 616 is also shown for customizing particular recipients, recipient groups, and/or recipient devices for which candidate messages are to not be presented in accordance with present principles when e.g. composing a message to that particular recipient. Thus, a field 618 is shown and may include one or more recipients for which the user has configured the device to exclude from presenting and/or to not present candidate messages when composing messages thereto, along with a modify selector element 620 selectable to initiate a modify function to change, add, and/or delete recipients from the field 620 (e.g. to add to the field 618, the device may present a listing of contacts for selection based on information from a contact list accessible to the device).

Without reference to any particular figure, it is to be understood in accordance with present principles that associating at least some of the candidate messages with respective candidate recipients as referenced herein may also include e.g. automatically without user input determining a recipient for a message to be composed (e.g. yet to specified by a user) based on context (e.g. the time of day and determining that the user typically messages the same person with at least one same or similar multi-term phrase at a particular time each day).

Also without reference to any particular figure, it is to be understood that context that may be used and/or on which determinations may be based in accordance with present principles may include whom a message is to be directed to and/or whom a message has been directed to in the past, further information about the sender and/or recipient (e.g. based on input from a user, accessed over the Internet such as from a social networking account, derived from past messages, derived from past Internet searches (e.g. searched using the device which is to transmit a message with a multi-term phrase) etc.). Furthermore, lexicons used by the sender and recipient may be included in multi-term phrases to be used in accordance with present principles, such as e.g. "sweetie" when referring to a wife contact, "bro" when referring to a friend contact, etc. What's more, if a message to be composed is e.g. a subsequent message in a message string or chain, the message to be created and/or automatically determined in accordance with present principles may be based on the context of the conversation as indicated in the string or chain as well. Thus, it is to be understood that multiple layers of contextually relevant information may be used.

Also, as understood herein, although multi-term phrases are specifically described and referenced, it is to be understood that single-term phrases and even e.g. single words or portions of words (e.g. a root word) may be similarly determined for input to compose a new message based on the single term or word being used in a previously sent message.

What's more, it is to be understood that e.g. messages as stored in the data structure for e.g. use at a later time to determine a multi-term phrase in accordance with present principles (e.g. past messages as sometimes referred to herein) may be e.g. messages that are audibly received (e.g. audible and/or voice input from the user) and/or received and converted to text for entry into the data structure using voice recognition technology.

Still without reference to any particular figure, present principles recognize that although e.g. a software application for undertaking present principles may be vended with a device such as the system 100, it is to be understood that present principles apply in instances where such an application is e.g. downloaded from a server to a device over a network such as the Internet.

Based on the present application, it may now be appreciated that a system in accordance with present principles may scan message histories and detect frequently used phrases. When sending a message, an option may be presented that provides access to these past messages for quicker composition of the message. The frequently used messages may then be edited on the fly by the user. The messages may be customized per user and/or recipient, and/or by a user, and the relationship between sender-receiver may also be derived based on the message history.

Furthermore, such messages may be abstracted to produce a e.g. formula response such as "I will be there in X mins," where "X" is a variable replaceable and/or determinable by a user. As noted herein, time of day, month, and/or year may also be considered such as e.g. a message "Merry Xmas" may not be an available choice all year, but "Happy Birthday/Anniversary/etc." may appear based on appropriateness per recipient e.g. at any time of the year.

While the particular AUTOMATIC MESSAGE PRESENTATION BASED ON PAST MESSAGES is herein shown and described in detail, it is to be understood that the subject matter which is encompassed by the present application is limited only by the claims.

What is claimed is:

1. A device comprising:
a processor;
storage accessible to the processor and bearing instructions executable by the processor to:
access past messages associated with the device;
determine that at least a first multi-term phrase appears in plural messages among the past messages at least a threshold number of times; and
based at least in part on the determination that the first multi-term phrase, appears in plural messages among the past messages at least the threshold number of times and based at least in part on data pertaining to at least, one Internet search performed at least in part using the device, present on the device at least plural terms from the first multi-term phrase in an order in which the at least plural terms appear in the first multi-term phrase.

2. The device of claim 1, wherein the instructions are executable by the processor to:
responsive to input invoking message composition and based at least in part on a determination that the first multi-term phrase appears in plural messages among the past messages at least the threshold number of times, present on the device at least plural terms from the first multi-term phrase.

3. The device of claim 2, wherein the input invoking message composition includes an identification of at least one recipient, and wherein the instructions are executable by the processor to:
responsive to the input invoking message composition and based at least in part on the identification of at least one recipient, present on the device at least plural terms from the first multi-term phrase.

4. The device of claim 1, wherein the past messages include messages sent from the device.

5. A method, comprising:
identifying stored messages with respective multi-term phrases as being candidate messages based on each of the multi-term phrases being respectively used in at least a threshold number of previous instances; and
present a user interface (UI) including a first component including one or more first recipients to present candidate messages when composing messages thereto; and
the UI including a second component including one or more second recipients not to present candidate messages when composing messages thereto.

6. An apparatus, comprising:
a first processor;
a first network adapter;
storage bearing instructions for execution by a second processor for: sending messages;
storing at least some of the messages in a data structure; and
responsive to user input and based at least in part on an identification of a recipient in the data structure, automatically presenting a message from the data structure;
wherein the automatically presented message has appeared in the data structure at least a threshold number of times to be automatically presented; and
wherein the first processor transfers the instructions over the network via the first network adapter, wherein
one or more first recipients to present candidate messages when composing messages thereto; and
the UI including a second component Including one or more second recipients not to present candidate messages when composing messages thereto.

7. The device of claim 1, wherein the threshold number of times is more than one time.

8. The device of claim 1, wherein the instructions are executable by the processor to:
present on the device the at least plural terms from the first multi-term phrase along with at least one dynamically determined character.

9. The device of claim 1, wherein the instructions are executable by the processor to:
present on the device the at least plural terms from the first multi-term phrase along with a variable to be edited by a user.

10. The device of claim 1, comprising a display accessible to the processor, and wherein the instructions are executable by the processor to:
present on the display an option selectable to edit multi-term phrases derived from past messages.

11. The device of claim 1, comprising a display accessible to the processor, and wherein the instructions are executable by the processor to:
present on the display at least one option selectable to one or more of enable and disable presentation of candidate multi-term phrases during message composition.

12. The device of claim 1, wherein the instructions are executable by the processor to:
present the at least plural terms from the first multi-term phrase at least in part based on identification of a special occasion.

13. The method of claim 5, comprising based at least in part on input indicating a recipient, presenting at least one of the candidate messages, wherein the at least one candidate message is presented on a display.

14. The method of claim 5, comprising:
presenting at least one of the candidate messages and presenting at least one additional character.

15. The method of claim 14, wherein the at least one additional character is dynamically determined.

16. The method of claim 14, wherein the at least one additional character is dynamically determined at least in part based on the recipient.

17. The method of claim 14, wherein the at least one additional character comprises at least one variable for editing.

18. The apparatus of claim 16, wherein the UI is a first UI and wherein the instructions for execution by the second processor comprise instructions for:
presenting a second user interface (UI) on a display accessible to the second processor, the second UI presenting at least one option to one or more of enable and disable automatic presentation of a message appearing in the data structure.

19. The apparatus of claim 6, wherein the UI is a first UI and wherein the instructions for execution by the second processor comprise instructions for:
presenting second a user interface (UI) on a display accessible to the second processor, the second UI presenting at least one option to edit messages that are to be automatically presented from the data structure.

20. A device. composing:
a processor:
a display accessible to the processor: and
storage accessible to the processor and bearing instructions executable by the processor to:
identify stored messages with respestise multi-term phrases as being candidate messages based on each of the multi-term phrases being respectvely used in at least a threshold number of previous instances: and
present a user interface (UI) on the display comprising a first component that comprises one or more first recipients for which to present candidate messages when composing messages thereto, the UI further comprising a second component that comprises one ot more second recipients for which to not present candidate messages when composing messages thereto.

21. The device of claim 20, wherein the instructions are executable by the processor to:
based at least in part on input indicating a recipient, present on the display at least one of the candidate messages.

22. The device of claim 20, wherein the UI is a first UI and wherein the instructions are executable by the processor to:
present a second user interface (UI) an the display, the second UI presenting at least one option to one or more of enable and disable automatic presentation of a message appearing in the data structure.

\* \* \* \* \*